US012784175B2

(12) United States Patent
Ho et al.

(10) Patent No.: US 12,784,175 B2
(45) Date of Patent: Nov. 3, 2026

(54) GAS DISPERSION PLATE INSPECTION METHOD, ITS ELECTRONIC EQUIPMENT, AND GAS DISPERSION PLATE INSPECTION DEVICE

(71) Applicant: National Cheng Kung University, Tainan City (TW)

(72) Inventors: Ching-Yuan Ho, Tainan City (TW); Sheng-Hung Chang, New Taipei City (TW); Yu-Wen Su, Yunlin County (TW)

(73) Assignee: NATIONAL CHENG KUNG UNIVERSITY, Tainan City (TW)

( * ) Notice: Subject to any disclaimer, the term of this patent is extended or adjusted under 35 U.S.C. 154(b) by 86 days.

(21) Appl. No.: 18/952,309

(22) Filed: Nov. 19, 2024

(65) Prior Publication Data

US 2025/0336052 A1 Oct. 30, 2025

(30) Foreign Application Priority Data

Apr. 29, 2024 (TW) ................................ 113115991

(51) Int. Cl.

| | |
|---|---|
| ***G06T 7/00*** | (2017.01) |
| ***G01B 11/24*** | (2006.01) |
| ***G01B 11/30*** | (2006.01) |
| ***G01N 21/88*** | (2006.01) |

(52) U.S. Cl.

CPC ............ *G06T 7/0004* (2013.01); *G01B 11/24* (2013.01); *G01B 11/306* (2013.01); *G01N 21/8851* (2013.01); *G01N 2021/8887* (2013.01)

(58) Field of Classification Search

CPC ..... G06T 7/0004; G01B 11/24; G01B 11/306; G01N 21/8851; G01N 2021/8887

See application file for complete search history.

(56) References Cited

FOREIGN PATENT DOCUMENTS

| | | | | |
|---|---|---|---|---|
| CN | 113774389 A | | 12/2021 | |
| JP | 2017178665 A | * | 10/2017 | ............. C04B 38/00 |

OTHER PUBLICATIONS

Official Action issued by Taiwan Intellectual Property Office on Jan. 8, 2025.

* cited by examiner

*Primary Examiner* — Jamil Ahmed
(74) *Attorney, Agent, or Firm* — LANWAY IPR SERVICES; Chun-Ming Shih

(57) ABSTRACT

A gas dispersion plate inspection method, its electronic Equipment, and gas dispersion plate inspection device, capturing an image data and a contour data to inspect a hole diameter and a surface flatness of a pre-inspection gas dispersion plate, allowing for the prediction of service life of the pre-inspection gas dispersion plate. This enables accurately predicting the remaining service life of the gas dispersion plate to plan the maintenance and replacement strategy for the pre-inspection gas dispersion plate in advance, thereby improving production efficiency and reducing costs.

11 Claims, 6 Drawing Sheets

GAS DISPERSION PLATE INSPECTION METHOD, ITS ELECTRONIC EQUIPMENT, AND GAS DISPERSION PLATE INSPECTION DEVICE

CROSS-REFERENCE TO RELATED APPLICATIONS

This application claims the priority of Republic of China Patent Application No. 113115991 filed on Apr. 29, 2024, in the State Intellectual Property Office of the R.O.C., the disclosure of which is incorporated herein by reference.

BACKGROUND OF THE INVENTION

Field of the Invention

This application relates to the field of semiconductor manufacturing, and more specifically, it pertains to a gas dispersion plate inspection method, its electronic equipment, non-transitory computer-readable storage medium, and gas dispersion plate inspection device.

Descriptions of the Related Art

The gas dispersion plate (hereinafter referred to as GDP) is used in plasma etching processes for gas dispersion. During the process, the by-products generated from etching are evacuated through a vacuum system, but some by-products may still accumulate on the GDP, leading to changes in the hole morphology and surface flatness of the GDP. This accumulation can even affect the uniformity of wafer etching. To address this issue, cleaning tasks must be performed during the process by introducing argon and corrosive fluorine-containing gases to remove the by-products adhering to the surface of the GDP.

However, the gases used in the cleaning process also react with the primary component of the GDP, aluminum, forming aluminum fluoride, which accumulates near the holes of the GDP. As a result, it is necessary to replace the GDP periodically to ensure production quality. Currently, the industry standard for replacing GDPs is based on a predetermined usage count or time, at which point the GDP is replaced. This replacement method, based on fixed criteria, cannot flexibly meet the varying conditions and requirements of different manufacturing processes, leading to increased production costs.

SUMMARY OF THE INVENTION

In view of the drawbacks of the prior art mentioned above, the present application provides a gas dispersion plate inspection method, its electronic device, and a gas dispersion plate inspection device, which can accurately predict the lifespan of the gas dispersion plate, reduce production costs, and improve production efficiency.

According to the first aspect of the embodiments of this application, a gas dispersion plate inspection method is provided, comprising: acquiring an image data and a contour data of a pre-inspection gas dispersion plate, wherein the pre-inspection gas dispersion plate comprises a plurality of holes; inspecting the image data to obtain the diameter of each hole of the pre-inspection gas dispersion plate, and inspecting the contour data to obtain the surface flatness of the pre-inspection gas dispersion plate; based on the diameter of each hole and the surface flatness, obtaining the lifespan inspection result of the pre-inspection gas dispersion plate.

Optionally, the image data of the pre-inspection gas dispersion plate can be acquired in the following manner: there are a plurality of target areas defined on the pre-inspection gas dispersion plate; using an image scanning device to capture the image data of each target area of the pre-inspection gas dispersion plate; stitching the image data of each target area of the pre-inspection gas dispersion plate to obtain a full-image data of the pre-inspection gas dispersion plate; inspecting the full-image data to obtain the image data of the pre-inspection gas dispersion plate.

Optionally, inspecting the image data to obtain the diameter of each hole of the pre-inspection gas dispersion plate comprises: performing binarization processing on the image data of the pre-inspection gas dispersion plate to obtain a binarized image data of the pre-inspection gas dispersion plate; identifying the pixel values of each pixel point in the binarized image data to obtain the diameter of each hole of the pre-inspection gas dispersion plate.

Optionally, identifying the pixel values of each pixel point in the binarized image data to obtain the diameter of each hole of the pre-inspection gas dispersion plate comprises: identifying the pixel values of each pixel point in the binarized image data, determining each hole of the pre-inspection gas dispersion plate and the number of pixels point contained in each hole; based on the lens magnification of the image capturing device of the image scanning device, the pixel width of each pixel point in the binarized image data, and the number of pixel points contained in each hole, obtaining the diameter of each hole of the pre-inspection gas dispersion plate.

Optionally, based on the lens magnification of the image capturing device of the image scanning device, the pixel width of each pixel point in the binarized image data, and the number of pixel points contained in each hole, obtaining the diameter of each hole of the pre-inspection gas dispersion plate comprises: determining the area of each hole based on the lens magnification of the image capturing device of the image scanning device, the pixel width of each pixel point in the binarized image data, and the number of pixels point contained in each hole; obtaining the diameter of each hole of the pre-inspection gas dispersion plate based on the area of each hole and the number of pixel points contained in each hole.

Optionally, obtaining the lifespan detection results of the gas dispersion plate based on the diameter of each hole comprises: defining a hole diameter threshold and a defective hole rate threshold, and determining each hole with a diameter smaller than the hole diameter threshold as a defective hole based on the diameter of each hole and the hole diameter threshold; obtaining the actual defective hole rate of the pre-inspection gas dispersion plate based on the total number of holes and the number of defective holes; if the actual defective hole rate exceeds the defective hole rate threshold, obtaining the detection result that the pre-inspection gas dispersion plate needs to be replaced.

Optionally, the contour data of the pre-inspection gas dispersion plate can be obtained by using a probe to contact each surface of the pre-inspection gas dispersion plate; wherein the contour data comprises three-dimensional contour data.

Optionally, inspecting the contour data to obtain the surface flatness of the pre-inspection gas dispersion plate comprises: determining multiple inspection areas of the pre-inspection gas dispersion plate, wherein each inspection area is arranged concentrically; obtaining the height of each inspection area corresponding to the pre-inspection gas dispersion plate based on the contour data; obtaining the surface flatness of the pre-inspection gas dispersion plate based on the height of each inspection area corresponding to the pre-inspection gas dispersion plate.

Optionally, obtaining the lifespan detection results of the pre-inspection gas dispersion plate based on the surface flatness comprises: determining the inspection area closest to the outer edge of the pre-inspection gas dispersion plate as a reference inspection area and determining each inspection area that is not designated as the reference inspection area as a target inspection area; comparing the height of each target inspection area with the height of the reference inspection area to obtain the actual height difference of each target inspection area compared to the reference inspection area; obtaining the detection result that the pre-inspection gas dispersion plate needs to be replaced or does not need to be replaced based on the actual height difference of each target inspection area compared to the reference inspection area.

According to the second aspect of the embodiments of this application, a gas dispersion plate inspection device is provided, comprising: an acquisition module for obtaining an image data and a contour data of a pre-inspection gas dispersion plate; an inspection module for inspecting the image data to obtain the diameter of each hole of the pre-inspection gas dispersion plate and inspecting the contour data to obtain a surface flatness of the pre-inspection gas dispersion plate; an analysis module for obtaining the lifespan detection results of the pre-inspection gas dispersion plate based on the diameter of each hole and the surface flatness.

According to the third aspect of the embodiments of this application, an electronic device is provided, comprising: a processor; and a memory storing a program, wherein the program comprises instructions that, when executed by the processor, cause the processor to execute the method as described in the first aspect.

According to the fourth aspect of the embodiments of this application, a non-transitory computer-readable storage medium storing a computer instruction is provided, wherein the computer instructions are for causing a computer to execute the method as described in the first aspect.

Compared with prior technologies, the inspection scheme for a gas dispersion plate provided by the embodiments of this application inspects the hole diameter and the surface flatness of the gas dispersion plate by obtaining the image data and contour data of the gas dispersion plate, thereby predicting the lifespan of the gas dispersion plate. This allows personnel to plan the maintenance and replacement strategy of the gas dispersion plate in advance, effectively improving production efficiency and reducing production costs.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

For a detailed description of the embodiments disclosed in the present application, please refer to figures.

Gas Dispersion Plate Inspection Method

Figure 1:
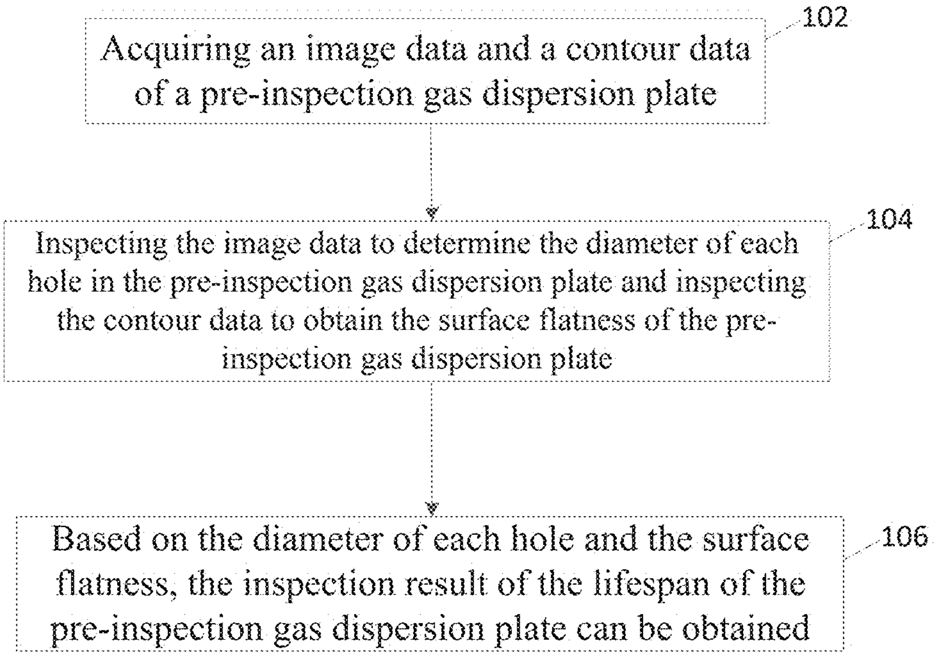
FIG. 1 is a flowchart of the gas dispersion plate inspection method according to an exemplary embodiment of this application.

FIG. 1 shows the process flow of the gas dispersion plate inspection method in an exemplary embodiment of this application. As shown in the figure, this embodiment mainly comprises:

Step 102: Acquiring an image data and a contour data of a pre-inspection gas dispersion plate.

Figure 2A:
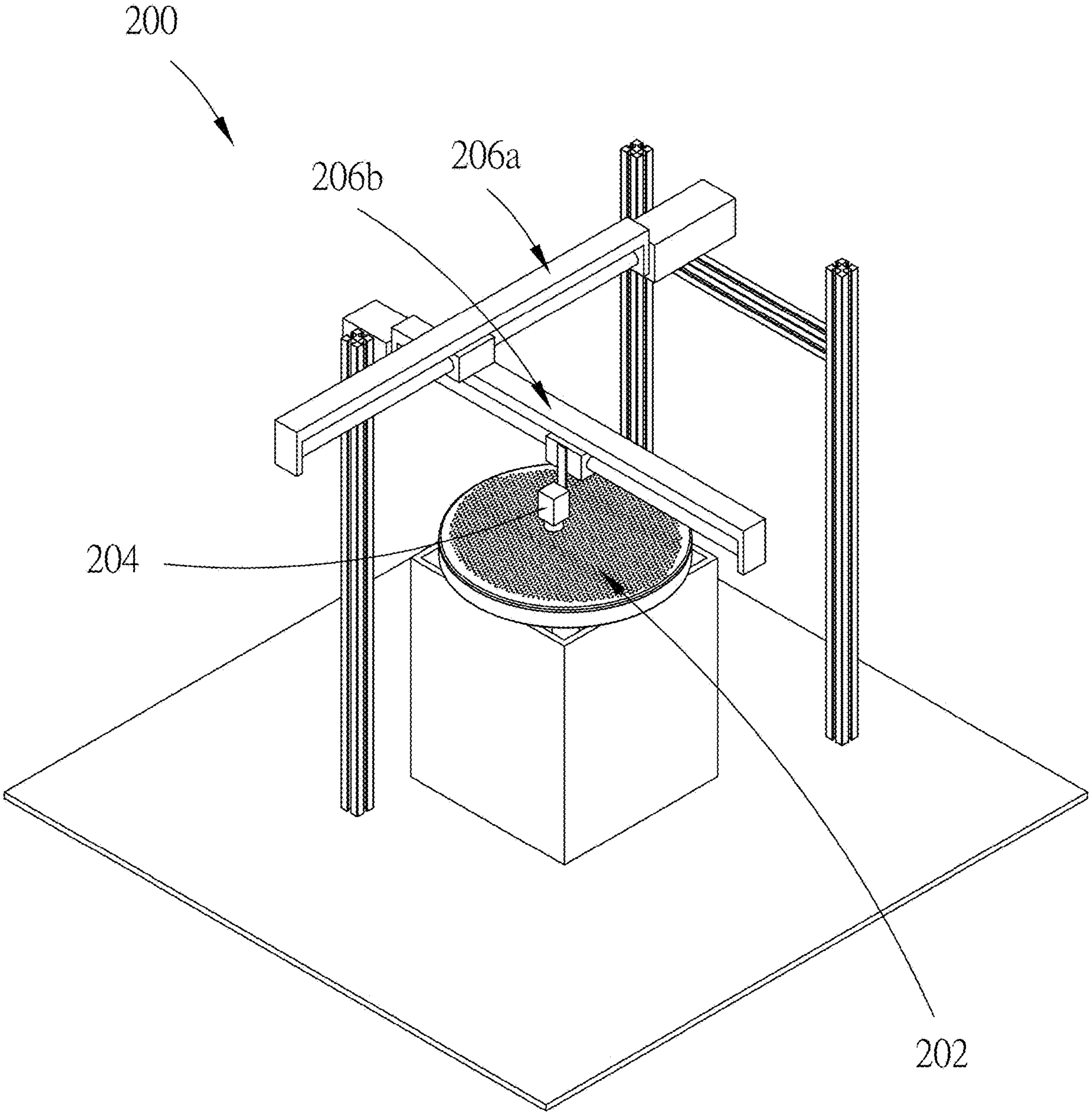
FIGS. 2A to 2B are schematic structural diagrams of the image scanning device for acquiring inspection data of the pre-inspection gas dispersion plate.
Figure 2B:
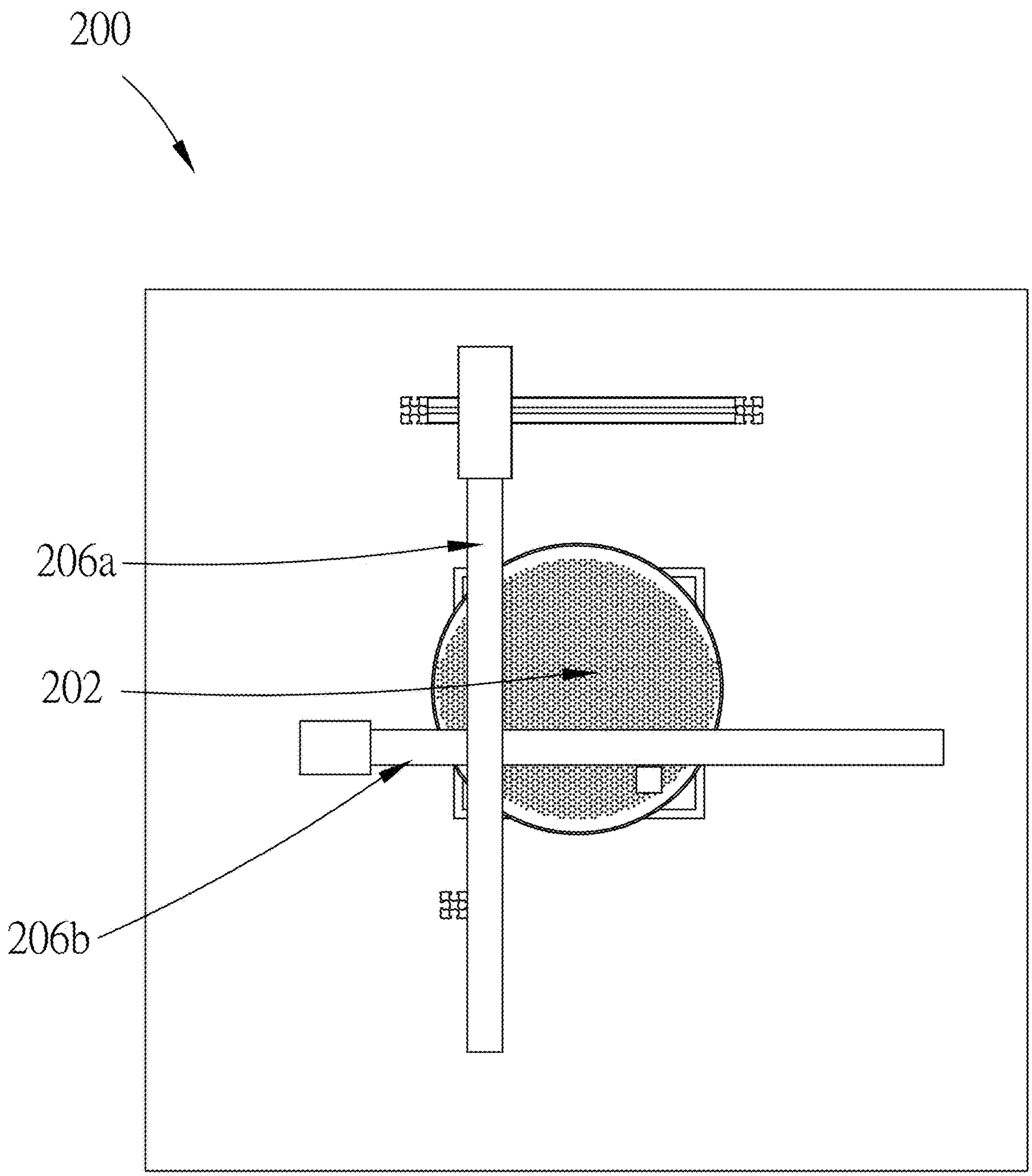

In some embodiments, the image data and contour data of the pre-inspection gas dispersion plate 202 can be acquired using an image scanning device 200 (as shown in FIGS. 2A to 2B).

Figure 2C:
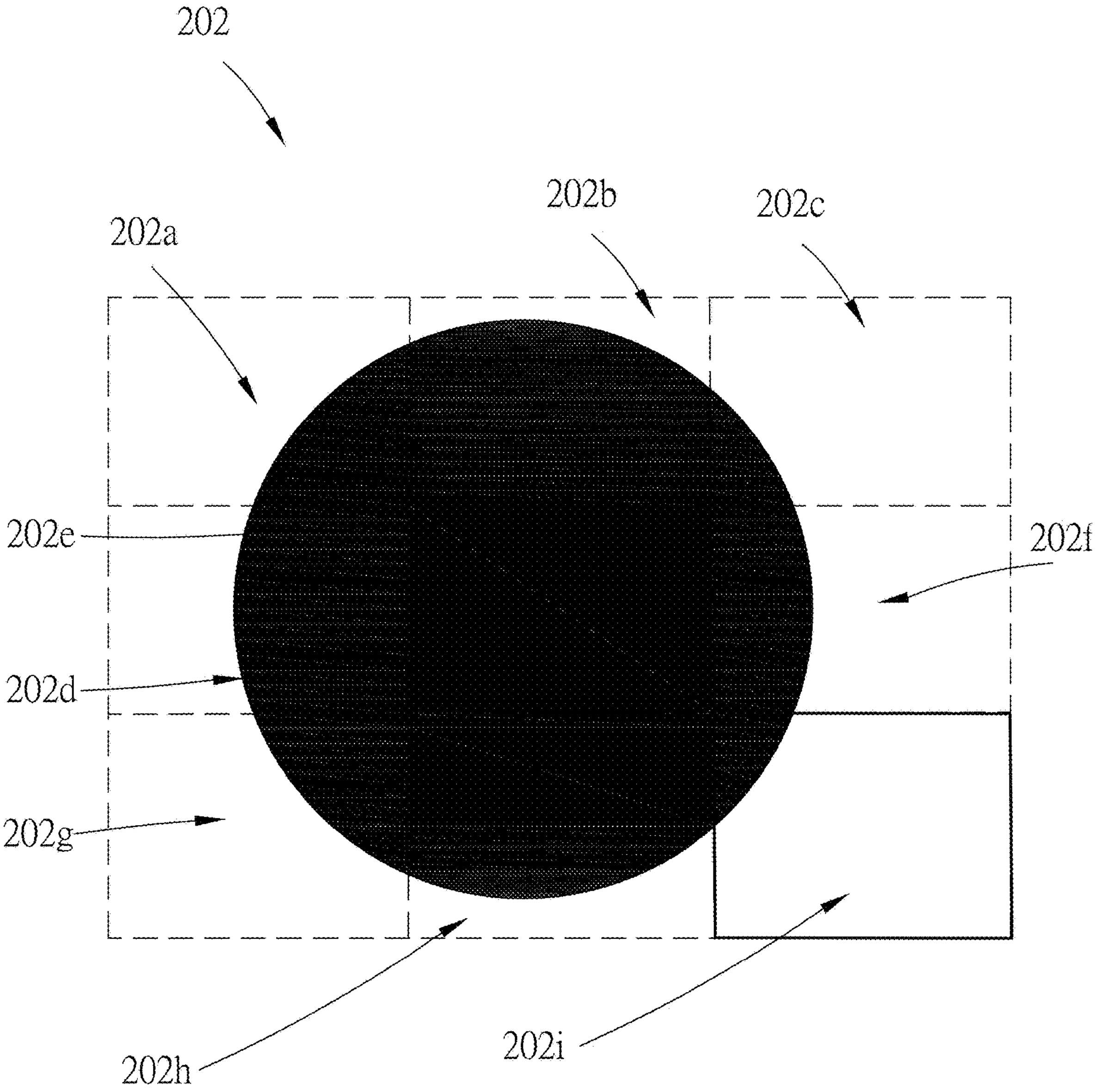
FIG. 2C is a schematic diagram of the image scanning device acquiring the image data of each target area of the pre-inspection gas dispersion plate.

For example, the image data of the pre-inspection gas dispersion plate can be obtained in the following way:

The image capturing device 204 of the image scanning device 200 can be driven along moving axes *206a* and *206b* to move relative to the pre-inspection gas dispersion plate 202, capturing the image data of each target area (refer to target areas *202a* to *202i* in FIG. 2C) of the pre-inspection gas dispersion plate 202. The image data of each target area is then stitched together to form a complete image of the pre-inspection gas dispersion plate 202, allowing for the inspection of image data of the pre-inspection gas dispersion plate 202.

In some embodiments, the contour data of the pre-inspection gas dispersion plate can be obtained by using a probe that contacts each surface of the pre-inspection gas dispersion plate 202, capturing the contour data of the pre-inspection gas dispersion plate 202.

In some embodiments, the contour data of the pre-inspection gas dispersion plate may comprises three-dimensional contour data.

Step 104: Inspecting the image data to determine the diameter of each hole in the pre-inspection gas dispersion plate and inspecting the contour data to obtain the surface flatness of the pre-inspection gas dispersion plate 202.

In some embodiments, the image data of the pre-inspection gas dispersion plate can be binarized to obtain binary image data. By identifying the pixel values of each pixel point in the binary image data, the diameter of each hole in the pre-inspection gas dispersion plate can be determined.

Typically, binarizing the image data converts the colored image into a black-and-white image, wherein the holes in the pre-inspection gas dispersion plate appear white, and the body of the pre-inspection gas dispersion plate 202 appears black, allowing each hole in the pre-inspection gas dispersion plate to be identified.

In some embodiments, the pixel values of each pixel point in the binary image data can be identified to determine each hole of the pre-inspection gas dispersion plate and the number of pixel points contained in each hole. The diameter of each hole can then be calculated based on the lens magnification of the image capturing device 204 in the image scanning device 200, the pixel width of each pixel point in the binary image data, and the number of pixel points contained in each hole.

For example, a calculation formula in the program can be used to convert the actual pixel width of each pixel point based on the given lens magnification of image capturing device 204.

In some embodiments, the area of each hole can be determined based on the lens magnification of image capturing device 204, the pixel width of each pixel point in the binary image data, and the number of pixel points contained in each hole. The diameter of each hole in the pre-inspection gas dispersion plate 202 can then be calculated based on the area of each hole and the number of pixel points contained in each hole.

Figure 3:
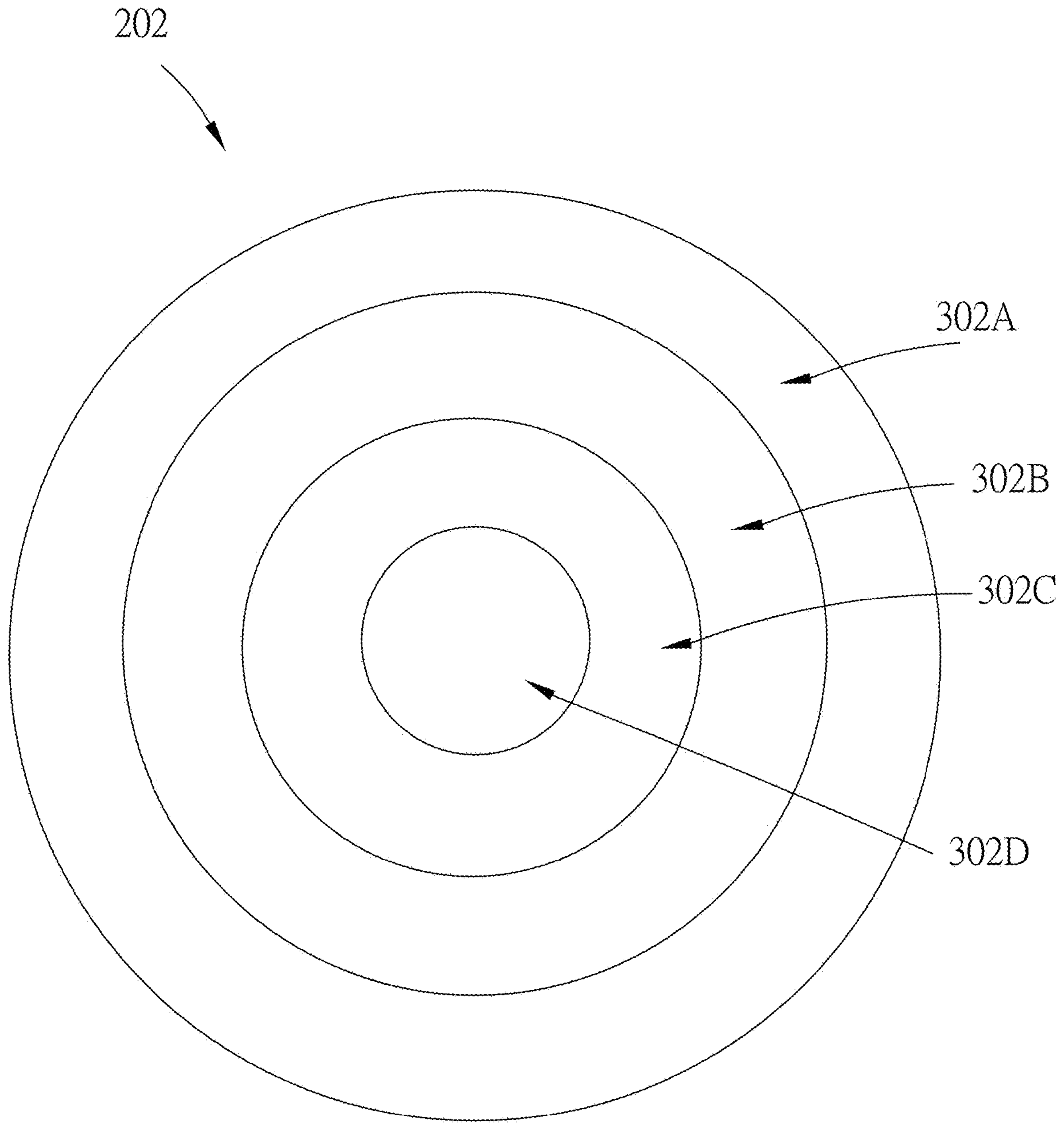
FIG. 3 is a schematic diagram showing the distribution of each inspection area of the pre-inspection gas dispersion plate.

In some embodiments, multiple inspection areas of pre-inspection gas dispersion plate (refer to 302A to 302D in FIG. 3) can be determined, where each inspection area is set concentrically.

Based on the contour data, the height of each inspection area of the pre-inspection gas dispersion plate 202 can be obtained. The surface flatness of the pre-inspection gas dispersion plate 202 can then be determined based on the height of each inspection area of the pre-inspection gas dispersion plate 202.

Step 106: Based on the diameter of each hole and the surface flatness, the inspection result of the lifespan of the pre-inspection gas dispersion plate 202 can be obtained.

In some embodiments, a hole diameter threshold and a defective hole rate threshold are defined. Each hole with a diameter smaller than the hole diameter threshold is identified as a defective hole based on the diameter of each hole and the hole diameter threshold. The actual defective hole rate of the pre-inspection gas dispersion plate is determined based on the total number of holes and the number of defective holes. If the actual defective hole rate exceeds the defective hole rate threshold, the inspection result will indicate that the pre-inspection gas dispersion plate needs to be replaced.

In some embodiments, the inspection area closest to the outer edge of the pre-inspection gas dispersion plate 202 can be designated as a reference inspection area, while other areas can be designated as target inspection areas. For example, an inspection area of pre-inspection gas dispersion plate 302A in FIG. 3 can be designated as the reference area, while inspection areas of pre-inspection gas dispersion plate 302B, 302C, and 302D can be designated as target areas. By comparing the height of each target area with the reference area, the actual height difference of each target area relative to the reference area can be determined. Based on this, the inspection result will indicate whether the pre-inspection gas dispersion plate 202 needs to be replaced.

In summary, the gas dispersion plate inspection method provided by this embodiment captures the image data and the contour data to inspect the hole diameter and the surface flatness of the pre-inspection gas dispersion plate 202, allowing for the prediction of its service life. This enables personnel to plan the maintenance and replacement strategy for the pre-inspection gas dispersion plate in advance, thereby improving production efficiency and reducing costs.

Gas Dispersion Plate Inspection Device

Figure 4:
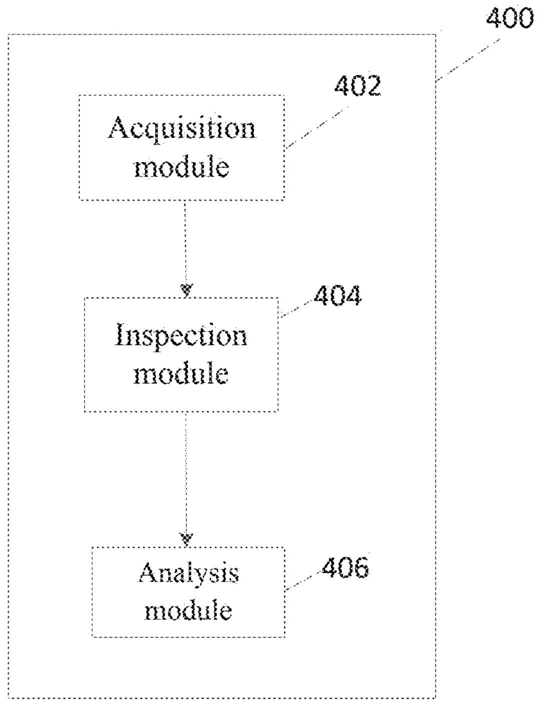
FIG. 4 is a schematic structural diagram of the gas dispersion plate inspection device according to an exemplary embodiment of this application.

FIG. 4 shows the structural block diagram of the gas dispersion plate inspection device in an exemplary embodiment of this application. As shown in the figure, the gas dispersion plate inspection device 400 comprises:

An acquisition module 402, used for acquiring an image data and a contour data of a pre-inspection gas dispersion plate.

An inspection module 404, used for inspecting the image data to obtain the diameter of each hole in the pre-inspection gas dispersion plate and inspecting the contour data to obtain the surface flatness of the pre-inspection gas dispersion plate 202.

An analysis module 406, used for obtaining the service life inspection result of the pre-inspection gas dispersion plate based on the diameter of each hole and the surface flatness.

The gas dispersion plate inspection device 400 in this embodiment can also be used to implement the corresponding steps in the gas dispersion plate inspection method described above. For details, refer to the method embodiments, which will not be repeated here.

Electronic Device

This embodiment also provides an electronic device that comprises: a processor; and a memory storing a program, wherein the program comprises instructions that, when executed by the processor, cause the processor to execute the steps described in the method embodiments above.

Storage Medium

This embodiment also provides a non-transitory computer-readable storage medium storing computer instructions, wherein the computer instructions are used to cause a computer to execute the steps described in the method embodiments above.

The examples above are only illustrative to explain principles and effects of the invention, but not to limit the invention. It will be apparent to those skilled in the art that modifications and variations can be made without departing from the spirit and scope of the invention. Therefore, the protection range of the rights of the invention should be as defined by the appended claims.

What is claimed is:

1. A gas dispersion plate inspection method, comprising:

acquiring an image data and a contour data of a pre-inspection gas dispersion plate, wherein the pre-inspection gas dispersion plate comprises a plurality of holes;

inspecting the image data to obtain a diameter of each hole of the pre-inspection gas dispersion plate, and inspecting the contour data to obtain a surface flatness of the pre-inspection gas dispersion plate; and based on the diameter of each hole and the surface flatness, obtaining a lifespan inspection result of the pre-inspection gas dispersion plate.

2. The gas dispersion plate inspection method as described in claim 1, wherein the image data of the pre-inspection gas dispersion plate is obtained through the following:

there are a plurality of target areas defined on the pre-inspection gas dispersion plate;

using an image scanning device to capture the image data of each target area of the pre-inspection gas dispersion plate;

stitching the image data of each target area of the pre-inspection gas dispersion plate to obtain a full-image data of the pre-inspection gas dispersion plate; and inspecting full-image data to obtain the image data of the pre-inspection gas dispersion plate.

3. The gas dispersion plate inspection method as described in claim 1, wherein inspecting the image data to obtain the diameter of each hole of the pre-inspection gas dispersion plate comprises:

binarizing the image data of the pre-inspection gas dispersion plate to obtain a binarized image data of the pre-inspection gas dispersion plate;

identify a pixel values of each pixel in the binarized image data to obtain the each hole diameter of the pre-inspection gas dispersion plate.

4. The gas dispersion plate inspection method as described in claim 3, wherein identifying the pixel values of each pixel point in the binarized image data to obtain the diameter of each hole of the pre-inspection gas dispersion plate comprises:

identifying the pixel values of each pixel point in the binarized image data to determine each hole of the pre-inspection gas dispersion plate and a number of pixel points contained in each hole;

determining the diameter of each hole of the pre-inspection gas dispersion plate based on a lens magnification of an image capturing device, a pixel width of each pixel point in the binarized image data, and the number of pixel points contained in each hole.

5. The gas dispersion plate inspection method as described in claim 4, wherein determining the diameter of each hole of the pre-inspection gas dispersion plate based on the lens magnification of the image capturing device, the pixel width of each pixel point in the binarized image data, and the number of pixel points contained in each hole comprises:

determining an area of each hole based on the lens magnification of the image capturing device, the pixel width of each pixel point in the binarized image data, and the number of pixel points contained in each hole;

based on the area of each hole and the number of pixels contained in each hole, obtaining the hole diameter of each hole on the pre-inspection gas dispersion plate.

6. The gas dispersion plate inspection method as described in claim 5, wherein obtaining the lifespan inspection result of the pre-inspection gas dispersion plate based on the diameter of each hole comprises:

defining a hole diameter threshold and a defective hole rate threshold and determining each hole with a diameter smaller than the hole diameter threshold as a defective hole based on the diameter of each hole and the hole diameter threshold;

determining an actual defective hole rate of the pre-inspection gas dispersion plate based on the number of holes and a number of defective holes;

if the actual defective hole rate exceeds the defective hole rate threshold, determining that the pre-inspection gas dispersion plate needs to be replaced.

7. The gas dispersion plate inspection method as described in claim 1, wherein the contour data of the pre-inspection gas dispersion plate is obtained through the following:

using a probe to contact each surface of the pre-inspection gas dispersion plate to obtain the contour data of the pre-inspection gas dispersion plate;

wherein the contour data comprises three-dimensional contour data.

8. The gas dispersion plate inspection method as described in claim 1, wherein inspecting the contour data to obtain the surface flatness of the pre-inspection gas dispersion plate comprises:

determining the plurality of inspection areas of the pre-inspection gas dispersion plate, wherein each inspection area is set as a concentric circle;

based on the contour data, obtaining a height of each inspection area corresponding to the pre-inspection gas dispersion plate;

determining the surface flatness of the pre-inspection gas dispersion plate based on the height of each inspection area corresponding to the pre-inspection gas dispersion plate.

9. The gas dispersion plate inspection method as described in claim 8, wherein obtaining the lifespan inspection result of the pre-inspection gas dispersion plate based on the surface flatness comprises:

determining an inspection area closest to the outer edge of the pre-inspection gas dispersion plate as a reference inspection area, and determining each inspection area not identified as the reference inspection area as a target inspection area;

comparing the height of each target inspection area with the height of the reference inspection area to obtain an actual height difference between each target inspection area and the reference inspection area;

based on the actual height difference between each target inspection area and the reference inspection area, determining whether the pre-inspection gas dispersion plate needs to be replaced.

10. A gas dispersion plate inspection device, comprising:

an acquisition module, used to acquire an image data and a contour data of a pre-inspection gas dispersion plate;

an inspection module, used to inspect the image data to obtain a diameter of each hole of the pre-inspection gas dispersion plate and inspect the contour data to obtain a surface flatness of the pre-inspection gas dispersion plate;

an analysis module, used to obtain a lifespan inspection result of the pre-inspection gas dispersion plate based on the diameter of each hole and the surface flatness.

11. An electronic device, comprising:

a processor; and a memory storing a program;

wherein the program comprises instructions that, when executed by the processor, cause the processor to execute the method as described in claim 1.

* * * * *